United States Patent [19]
Ritter et al.

[11] 3,731,042
[45] May 1, 1973

[54] WELDING MACHINE FOR MANUFACTURE OF WIRE MESH

[75] Inventors: Klaus Ritter; Hans Gott; Gerhard Ritter; Josef Ritter, all of Graz, Austria

[73] Assignee: EVG Entwicklungs-und Verwertungsgesellschaft m.b.H., Graz, Austria

[22] Filed: Jan. 24, 1972

[21] Appl. No.: 220,306

[30] Foreign Application Priority Data

Jan. 28, 1971 Austria..............................A 723/71

[52] U.S. Cl. ....................219/56, 140/112, 219/116
[51] Int. Cl. ...........................................B23k 11/00
[58] Field of Search..................219/56, 87, 116; 140/112

[56] References Cited

UNITED STATES PATENTS

| | | | |
|---|---|---|---|
| 3,619,541 | 11/1971 | Webers | 219/56 |
| 828,772 | 8/1906 | Patterson | 219/56 X |
| 3,286,072 | 11/1966 | Ritter et al. | 219/56 |

*Primary Examiner*—R. F. Staubly
*Attorney*—Ernest F. Marmorek

[57] ABSTRACT

A welding machine is disclosed of the type in which an array of longitudinal wires occupying a product plane of the machine is advanced past a transverse row of welding heads which weld transverse wires to the longitudinal wires by electric resistance welding. Each welding head comprises an electrode above the product plane and an electrode below the product plane, these being interconnected by a connecting piece which is rigid with the upper electrode and to which the lower electrode is movably mounted. A thrust beam is vertically reciprocated below the lower electrodes so that each longitudinal wire is thrust upwards against the traverse wire during welding. Transformers for supplying the welding current and busbars for conducting the current to the welding heads are situated above the product plane and the welding heads are suspended from the busbars.

13 Claims, 4 Drawing Figures

WELDING MACHINE FOR MANUFACTURE OF WIRE MESH

One kind of welding machine for making wire mesh, such as that suitable for reinforcing concrete for example, has a transverse row of electrode pairs past which an array of longitudinal wires is advanced and which serve to weld transverse wires to the longitudinal wires to form the mesh. The two electrodes of each pair are connected together mechanically, to form a welding head, by a connecting piece which extends across the product plane, i.e. the plane occupied by the longitudinal wires. Electric current is fed from transformers to the electrodes by busbars and conductors, the conductor for one of the electrodes of each pair extending across the product plane, and a thrust beam, which is common to all the electrode pairs, is arranged to thrust one electrode of each pair into engagement with the wires, the other electrode remaining stationary.

A wire mesh welding machine of this kind has already been described by the present applicant in the Austrian Pat. specification 295,294. In this known machine the busbars and the transformers which feed the busbars with current are situated below the product plane. The individual electrode units, with "rider electrodes" are mounted on the busbars in such a way that they can be secured at the desired distances apart. A thrust beam thrusts downwards against the upper electrodes, which are mounted moveably on the welding heads, the thrust beam being driven by a driving mechanism fixed to the lower part of the machine, through a linkage system which transmits the drive to the thrust beam situated above.

According to the present invention, the busbars and transformers of a machine of the kind described are situated above the product plane and the welding heads are suspended in the machine in such a way that the stationary electrode of each pair is above the product plane and the lower electrode which is mounted moveably on the corresponding connecting piece, the common thrust beam and a drive mechanism for the thrust beam are all below the product plane.

Positioning the busbars above the product plane provides several advantages. In the first place metal splashed from the welding zone does not soil the busbars, for the splashed material falls downwards under gravity. A further advantage obtained is that the welding transformers can conveniently be mounted above the busbars, where they occupy a space which is not otherwise utilized. The transformers are therefore also protected from dirt and splashed metal, which can produce short circuits. The space below the product plane becomes free, allowing the entire machine to be of shorter construction. The transformers can be connected to the busbars over very short conductors, minimizing power loss. The thrust beam can be positioned in the lower part of the machine, below the product plane, quite close to the driving mechanism, the driving power being transmitted over a short path.

The welding heads are preferably suspended directly from the appropriate busbars, for example, by means of clamping pieces which are electrically insulated from each other and also serve as feed conductors. With this arrangement the busbars perform two functions. In the first place they feed current to the electrodes and secondly the busbars serve as supports from which the electrodes are suspended, correctly positioned in the machine.

The individual welding heads can be mounted in such a way that they are easily displaceable in position along the busbars, which extend transversely across the machine; the operator can then secure each welding head at the desired location. This allows wire mesh to be welded using any uniform or irregular longitudinal wire spacing. To obtain the closest longitudinal wire spacing the welding heads are grouped very close together.

Although the welding heads are actuated in common by a single thrust beam, the thrust may be transmitted to each individual welding head through a thrust pin which can be engaged and disengaged. This allows the welding heads to be actuated selectively, different longitudinal wire spacings being obtainable without shifting the welding heads in position.

A particularly convenient arrangement is obtained in that each welding head has two or more guides for longitudinal wires spaced apart from each other but within the width of the welding electrodes. The widths of the welding heads and the positioning of the longitudinal wire guides in the individual welding head should be such that when the welding heads are arranged in a row close to each other the longitudinal wire guides are all spaced at equal distances apart. The longitudinal wire spacing obtained in this way is the closest longitudinal wire mesh which can be produced by the machine. Whole number multiples of this minimal spacing can be produced by feeding longitudinal wires to only every second or third longitudinal wire guide, engaging only the corresponding welding heads.

An example of the machine according to the invention is illustrated in the accompanying drawings, in which.

Figure 1:
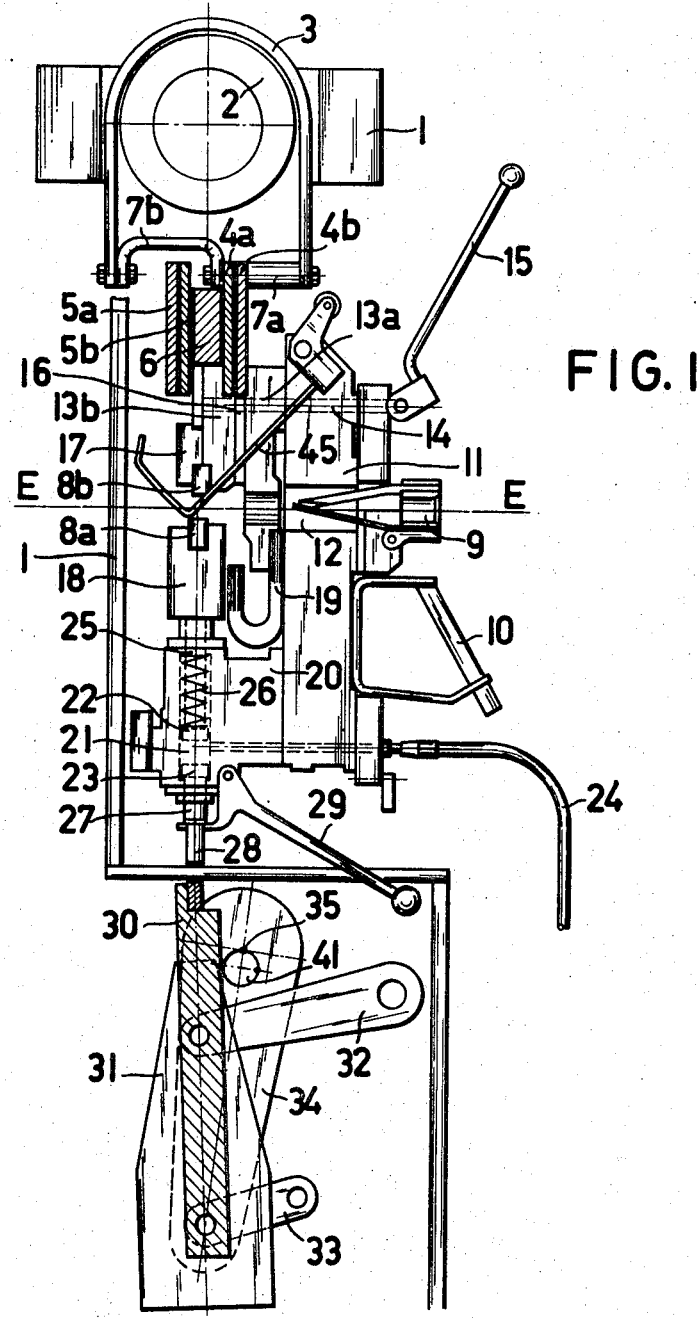
FIG. 1 is a side elevational cross section through the machine.

Welding transformers with primary windings 2 around which are looped hoop-shaped secondary windings 3 are mounted in an upper part of the machine, and are supported by the machine frame 1, which is merely indicated in the drawing. The machine is preferably equipped with two groups of transformers with different transformation ratios. The transformers feed welding current to two pairs of busbars 4a, 4b and 5a, 5b which can extend right across the machine or can if desired be in the form of individual sections electrically bonded together. Current can then be fed at either one of two different voltages to the welding electrode.

The busbars are fixed to a supporting beam 6, which also extends right across the machine. The busbars are insulated from each other and insulated from the supporting beam 6 by layers of insulation, represented by thick lines in the figure. The welding current is fed from the secondary windings 3 of the transformers to the busbars over electric conductors 7a and 7b. In the drawing these are shown only for the pair of busbars 4a and 4b.

Welding heads are suspended from the pairs of busbars 4a,4b, and 5a,5b. The welding heads are distributed at variable intervals across the machine, the intervals being adjusted to suit the particular job in hand. Each welding head has an upper welding electrode 8b, situated above the product plane E—E, and a lower welding electrode 8a situated below this plane. The two welding electrodes 8a and 8b are joined together mechanically by a connecting piece 11 which passes through the product plane E—E.

The two welding electrodes 8a and 8b are connected electrically to the two busbars 4a and 4b by two clamping pieces 13a and 13b, situated near the upper end of the connecting piece 11. The two clamping pieces 13a and 13b are clamped to the pair of busbars 4a and 4b by a tension bolt 14. The clamping force is applied by a manually operated tensioning lever 15. The entire welding head is thus suspended from the busbar pair 4a, 4b (or, with minor structural modifications, from the busbar pair 5a, 5b). Between the two clamping pieces 13a,13b there is an interposed electrically insulating pad 16, made of an elastically flexible electrically insulating material. When the clamping force is applied the insulating pad 16 is squashed somewhat. To facilitate manipulation of the welding head, particularly after the clamp has been opened, a handgrip 10 is attached to the connecting piece 11 at a location underneath the tensioning lever 15. The upper electrode 8b is clamped between a further clamping piece 17 and the clamping piece 13b. The lower electrode 8a, on the other hand, is fixed in an electrode holder 18 which is electrically connected to the clamping piece 13a by a flexible conductor 19. Thus the welding current flows to the two electrodes over the two clamping pieces 13a and 13b.

It will be observed that, due to the positioning of the busbars 4a, 4b and 5a, 5b above the product plane E—E, any welding material which splashes out from between the electrodes 8a and 8b does not reach the busbars and therefore cannot soil them.

Fixed to the lower end of the connecting piece 11 there is an electrode guide 20 in which the electrode holder 18 is mounted to slide vertically up and down. The electrode guide 20 contains a vertical bore 21 in which two pistons 22 and 23 can slide. The part of the bore 21 between the two piston 22 and 23 is filled with a hydraulic fluid, preferably oil, which is supplied under a constant pressure from a main hydraulic line which is not shown in the drawing.

The piston rod 25 of the upper piston 22 is surrounded by a return spring 26 which thrusts the piston 22 downwards, so that the electrode holder 18 attached to the upper end of the piston rod 25 is constantly thrust downwards, that is to say away from the product plane E—E, by the spring.

Figure 4:
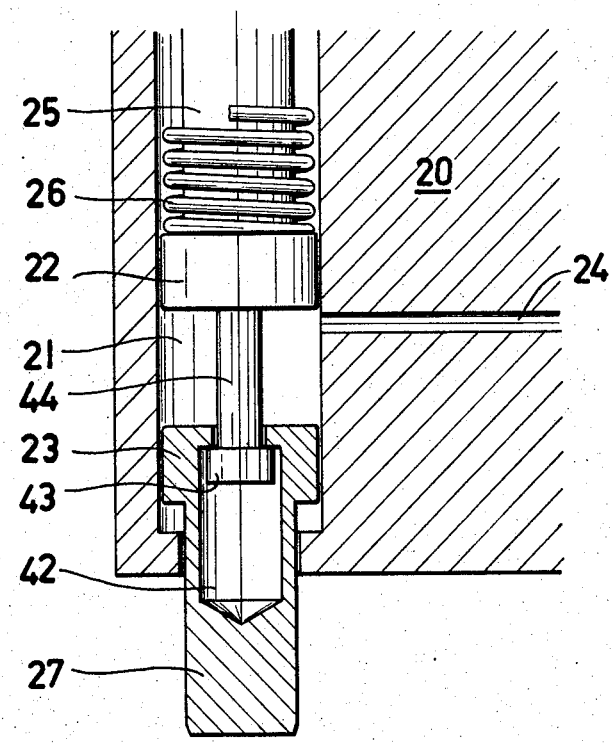
FIG. 4 shows a detail of a linkage for transmitting thrust from the thrust beam to lower electrodes.

As shown in FIG. 4, the lower piston 23 and its short piston rod 27 contain an inner bore 42 in which slides a cylindrical terminal collar 43 of a tension rod 44 fixed to the upper piston 22. The lower piston 23 and its short piston rod 27 together form a pressure piece. A thrust pin 28 is arranged so that it can be engaged and disengaged, by means of a pivoted lever 29 which is actuated by the operator, by bringing it into and out of the path of movement of a thrust beam 30 which is raised and lowered by a driving mechanism. This arrangement allows the welding heads to be engaged and disengaged individually, to suit the particular requirements. For example if the welding heads 8 are distributed across the machine equally spaced apart, suspended from the busbars, and it is desired to weld a wire mesh in which the longitudinal wires are spaced twice as far apart, the operator can change over simply by disengaging each second welding head, by actuating the relevant pivoted levers 29 disengaging the corresponding thrust pins 28.

The thrust beam 30, which extends right across the machine, is supported at each end by a thrust beam support 31 which is guided in its movements by two pivoted links 32 and 33 which are driven, through a connecting rod 34, by an eccentric 35 mounted on a shaft 41. FIG. 1 shows only the middle point of the eccentric 35.

Figure 2:
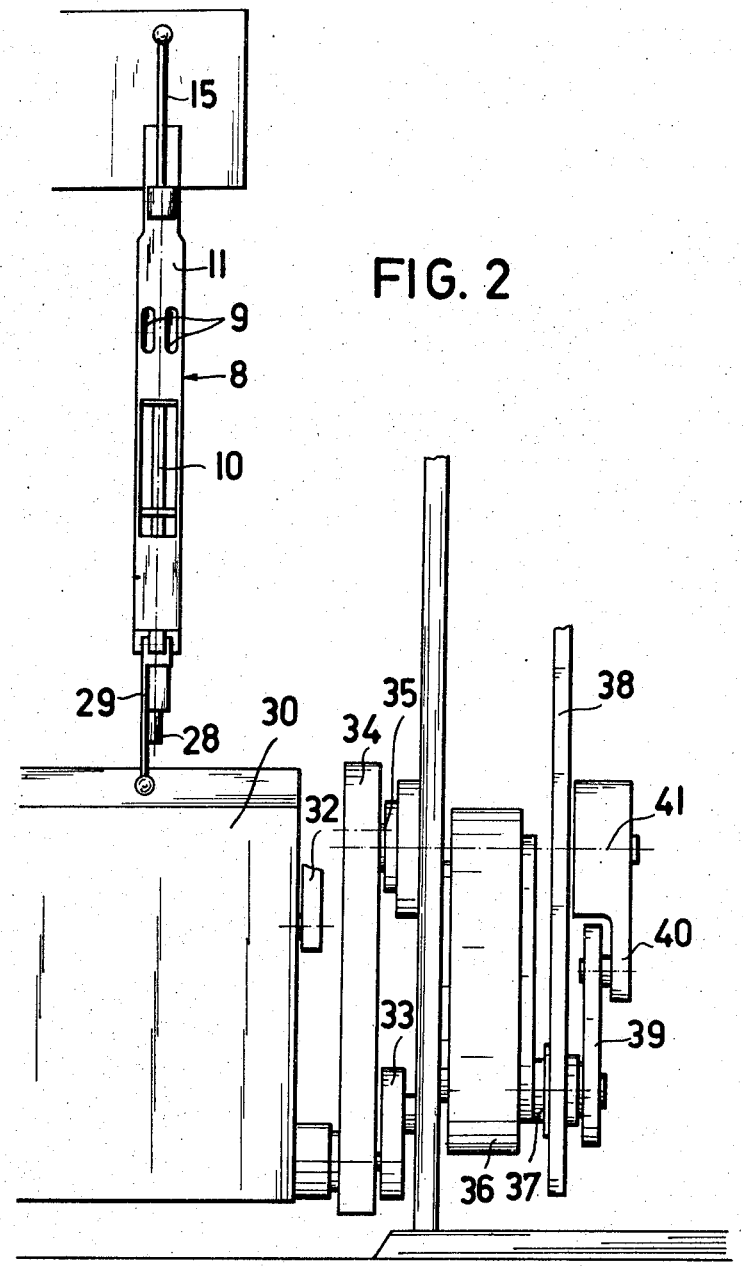
FIG. 2 is a front view of the machine, showing in particular a welding head and a drive system for driving a thrust beam.
Figure 3:
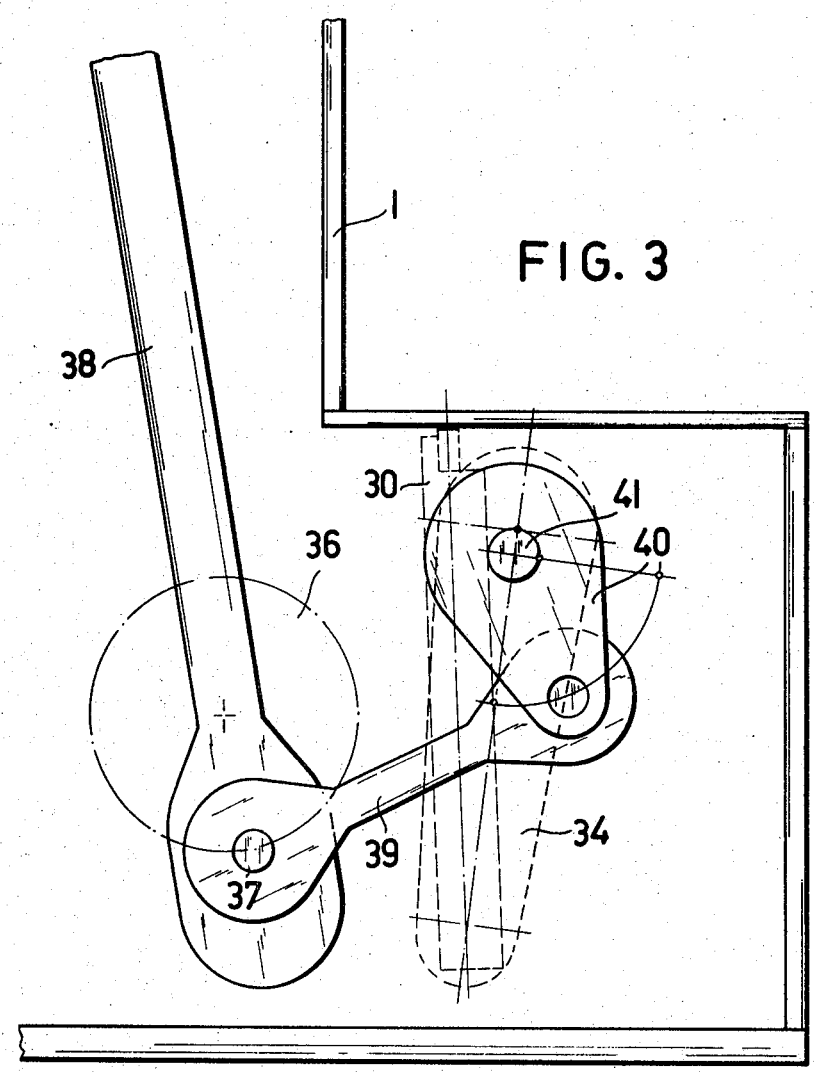
FIG. 3 is a side view showing a detail of the drive system.

The driving system is represented in FIGS. 1 to 3. Drive is taken from the crank pin 37 of a driving wheel 36. Two connecting rods 38 and 39 are pivoted on the crank pin 37. The connecting rod 38 is for actuating the mechanism which advances the wire mesh through the machine. This mechanism is not represented in the drawings because it is not a part of the present invention but it can, for example, be arranged as described in the Austrian Pat. specification 186,940. The connecting rod 39 connects the crank pin 37 to an oscillating lever 40 which is fixed to the shaft 41 carrying the eccentric 35 which drives the connecting rod 34 which in turn drives the thrust beam 30. The arrangement ensures that with the rotation of the driving wheel 36 the thrust beam 30 is driven up and down with an almost linear motion. During its upward movement the thrust beam 30 applies an upward thrust to each of the thrust pins 28 which are engaged, delivering the necessary welding pressure to the corresponding electrodes, as will be described further below.

When the thrust pin 28 is disengaged, that is to say when it has been swung out of the path of the thrust beam 30, or when the thrust beam is in its lowered position, the same pressure acts on the two annular surfaces of equal area of the pistons 22 and 23, surrounding the tension rod 44 of the piston 22. The system consisting of the two pistons is therefore in a state of internal equilibrium but is subjected to the thrust applied externally by the helical spring 26. Consequently the two pistons are thrust downwards into their lowest positions.

As soon as the thrust beam 30, acting through the thrust pin 28, applies a thrust to the lower end of the piston rod 27, the piston 23 moves upwards, with the result that the cylindrical terminal collar 43 in the bore 42 of the piston 23 is no longer up against a stop. Consequently the oil, which is under pressure, applies a net upward thrust to the piston 22, which therefore moves upwards, compressing the helical spring 26. The piston 22 continues moving upwards until the electrode 8a, which is connected rigidly to the piston 22 through the piston rod 25, comes into contact with the crossed wires, which are supported rigidly by the other electrode 8b. Under these circumstances the longitudinal wire is in contact with the electrode 8a, the transverse wire being clamped between the longitudinal wire and the electrode 8b.

Up to this instant the two pistons have been moving upwards at the same speed. Now however the piston 22 comes to a standstill, the piston 23 continuing to move upwards until the thrust beam reverses its direction of movement. During this process oil is expelled from the bore 21, the oil flowing out through the pressure control valve of the main hydraulic line of the hydraulic oil supply system.

The arrangement ensures that the thrust applied to the crossed wires remains constant irrespective of variations in wire diameter and irrespective of the melting-in of the wires during the welding process. In order to change over to a closer wire spacing, for example by engaging further welding head units, it is merely necessary to connect the hydraulic feed line 24 of the particular welding head unit to the hydraulic supply system. For this purpose plug connections are preferably used. This applies the same hydraulic pressure to the freshly connected welding head units as is applied to all the previously engaged units.

Two or more hydraulic supply systems can be provided, giving two different hydraulic pressures. The hydraulic supply lines 24 of the welding head units can be connected to either of the hydraulic supply systems. This allows wires of widely differing diameters to be welded, in each case using the most appropriate welding thrust.

The arrangement for feeding the transverse wires is indicated only diagrammatically in FIG. 1. Pivoted on the side of each welding head unit 8 there is a transverse wire feed device 45. The transverse wire (not shown) is fed by a pivoted movement of the feed device 45 into position between the two welding electrodes 8a, 8b, above the array of longitudinal wires. The pivoted feed devices 45 of all the welding head units are actuated in common by a driving mechanism (not shown) whose movements are synchronized with the other movements of the machine.

Each welding heat unit 8 has a guide 9 for the longitudinal wire. The guide 9 is mounted on the connecting piece 11 so that it can move up and down, preferably with a pivotal movement. The longitudinal wire penetrates through a passage 12 in the connecting piece 11 before reaching the welding zone. The moveable wire guide 9 allows the wire to follow the movements of the lower electrode 8a. The wire is lifted by the electrode 8a and subsequently moves downwards under gravity.

As shown in particular in FIG. 2, in a preferred form of the machine, each welding head unit 8 has two longitudinal wire guides 9 for each pair of welding electrodes 8a, 8b. The two wire guides 9 are spaced a specified distance apart. This makes it possible, on the one hand, to weld the transverse wire to two parallel longitudinal wires, using the pair of electrodes 8a and 8b. Alternatively the transverse wire can be welded to only one longitudinal wire, guided by either the righthand or the lefthand wire guide 9. The width of the welding hand unit 8 is such that if the welding head units are positioned in contact with each other all across the machine the guides 9 are all equally spaced apart. Under these circumstances the distance between neighboring guides 9 is the closest longitudinal wire spacing obtainable. On the other hand by using only some of the guides 9, and engaging only the corresponding welding heads 8, any multiple of this longitudinal wire spacing can be obtained.

The example described and illustrated can be modified in various ways. For example it is not necessary to clamp the welding heads directly to the busbars. The welding heads can if desired be suspended from a transverse beam in such a way that conducting paths are formed between the busbars and the welding electrodes.

We claim:

1. A welding machine for the manufacture of wire mesh, said machine comprising means for advancing a planar array of longitudinal wires, said array defining a product plane of the machine, transformer means disposed above said product plane, bushbar means disposed above said product plane, a plurality of upper electrodes disposed above said product plane in a row extending transversely of said longitudinal wires, an equal plurality of lower electrodes disposed in a transverse row below said product plane, each of said lower electrodes being below a different one of said upper electrodes whereby said electrodes form a plurality of electrode pairs, connecting means for each of said electrode pairs, said connecting means being rigid with its upper electrode and including means movably mounting its lower electrode, and each said connecting means extending across said product plane, electrical conductor means connecting each electrode pair to said busbar means, thrust beam means disposed beneath said product plane, and drive means for reciprocating said thrust beam means in a generally vertical direction to engage and raise said lower electrodes, said drive means being disposed below said product plane.

2. A machine according to claim 1, wherein said electrical conductor means connecting said busbars to said electrode pairs comprise clamping pieces which are electrically insulated from each other and by which said electrode pairs are suspended directly from said busbars.

3. A machine according to claim 2, wherein each clamping piece includes a clamping lever.

4. A machine according to claim 3, wherein each electrode pair includes a handgrip attached thereto at a location below said clamping lever.

5. A machine according to claim 1, wherein each electrode pair includes a flexible conductor for feeding welding current to said lower electrode, and said lower electrode is supported resiliently by thrust means adapted to be raised by said thrust beam means.

6. A welding machine for the manufacture of wire mesh, said machine comprising means for advancing a planar array of longitudinal wires, said array defining a product plane of the machine, transformer means disposed above said product plane, busbars means disposed above said product plane, a plurality of upper electrodes disposed above said product plane in a row extending transversely of said longitudinal wires, a plurality of lower electrodes disposed in a transverse row below said product plane, each of said lower electrodes being below a different one of said upper electrodes whereby said electrodes form a plurality of electrode pairs, connecting means for each of said electrode pairs, said connecting means being rigid with its upper electrode and including means movably mounting its lower electrode, and each said connecting means extending across said product plane, electrical conductor means connecting each electrode pair to said busbar means, thrust beam means disposed beneath said product plane, and drive means for reciprocating said thrust beam means in a generally vertical direction to engage and raise said lower electrodes, said drive means being disposed below said product plane, wherein each electrode pair includes a flexible conductor for feeding welding current to said lower electrode, and said lower electrode is supported resiliently by thrust means adapted to be raised by said thrust beam means, wherein each electrode pair is equipped with a thrust pin and means movably mounting said thrust pin to said electrode pair and permitting movement of said thrust pin from an engaged position in the path of movement of said thrust beam means to a disengaged position clear of said path of said movement of said thrust beam means.

7. A welding machine for the manufacture of wire mesh, said machine comprising means for advancing a planar array of longitudinal wires, said array defining a product plane of the machine, transformer means disposed above said product plane, busbars means disposed above said product plane, a plurality of upper electrodes disposed above said product plane in a row extending transversely of said longitudinal wires, a plurality of lower electrodes disposed in a transverse row below said product plane, each of said lower electrodes being below a different one of said upper electrodes whereby said electrodes form a plurality of electrode pairs, connecting means for each of said electrode pairs, said connecting means being rigid with its upper electrode and including means movably mounting its lower electrode, and each said connecting means extending across said product plane, electrical conductor means connecting each electrode pair to said busbar means, thrust beam means disposed beneath said product plane, and drive means for reciprocating said thrust beam means in a generally vertical direction to engage and raise said lower electrodes, said drive means being disposed below said product plane, wherein each electrode pair includes a flexible conductor for feeding welding current to said lower electrode, and said lower electrode is supported resiliently by thrust means adapted to be raised by said thrust beam means, further comprising for each electrode pair a first hydraulic piston, a return spring for said first hydraulic piston, a second piston, a piston rod for said second piston, a bore in said connecting means sealingly containing both said first and said second piston, and connecting means for said first and second pistons adapted to limit the distance therebetween.

8. A machine according to claim 7, further comprising a hydraulic supply system communicating to at least some of said bores in said connecting pieces.

9. A machine according to claim 7, further comprising a plurality of hydraulic supply systems containing hydraulic fluid at different pressures, and means for selectively connecting said bores in said connecting pieces to said hydraulic supply systems.

10. A machine according to claim 1 further comprising a driving wheel, a crank pin of said driving wheel, and, working on said crank pin, both a first connecting rod forming part of said means for advancing said planar array of longitudinal wires and a second connecting rod forming part of said driving means for reciprocating said thrust beam means.

11. A machine according to claim 1, including a plurality of feed means for said transverse wires mounted to at least some of said electrode pairs, and common drive means for all said transverse wire feed means.

12. A machine according to claim 1, wherein each of said electrode pairs is provided with at least one vertically movable guide means for said longitudinal wire.

13. A machine according to claim 12, wherein each electrode pair is provided with a plurality of guides for longitudinal wires, said guide means being spaced apart from each other by a distance less than the width of each of said electrodes, said electrode pairs being disposable in a closed up position with all of said guides for said longitudinal wires being uniformly spaced apart.

* * * * *